Nov. 3, 1925.  1,560,158
W. E. GLASPEY
MECHANISM FOR MAKING GLASS CONTAINERS
Filed Oct. 22, 1923   4 Sheets-Sheet 1
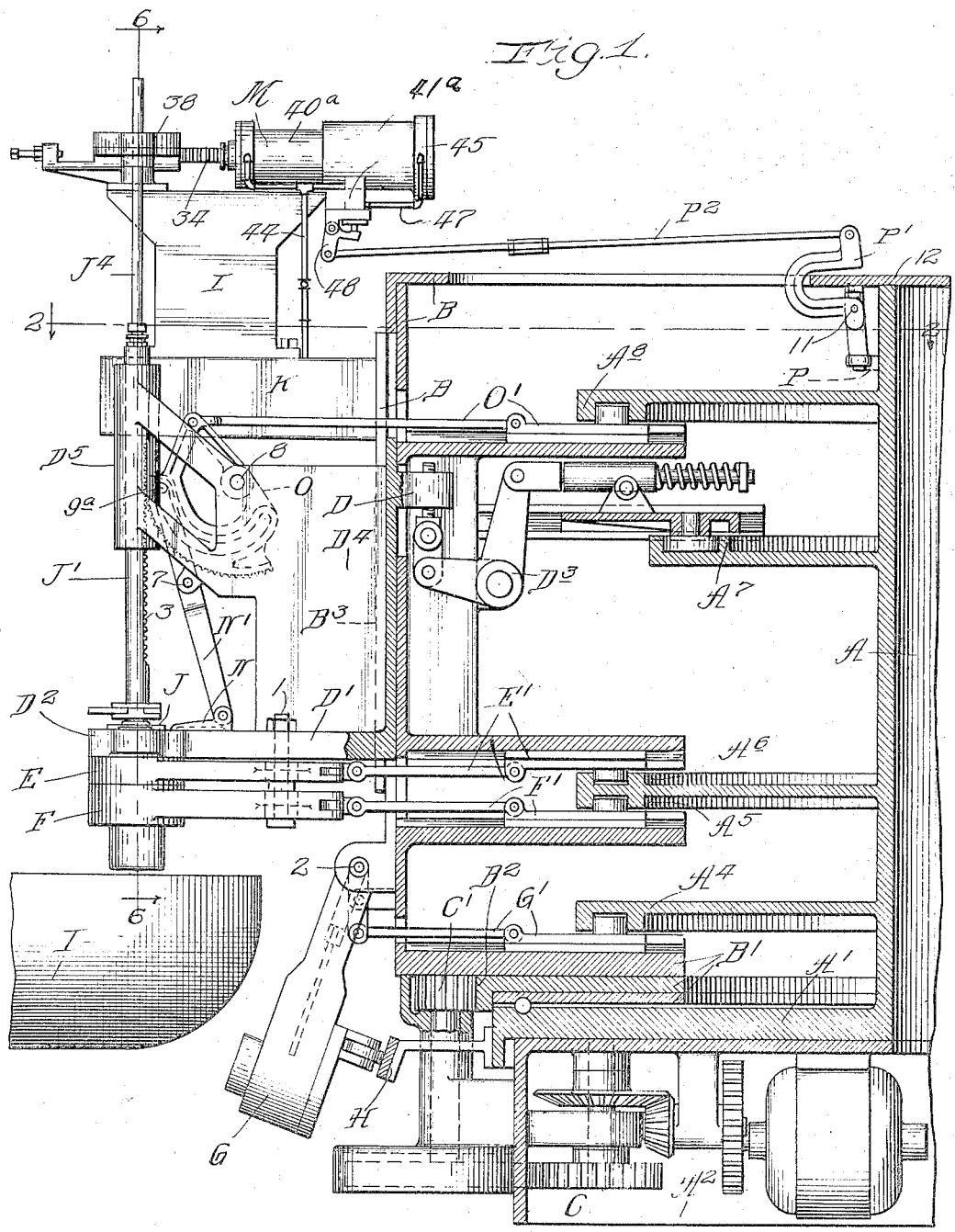
Inventor:
Warren E. Glaspey,
By Dynenforth, Lee, Chritton & Wiles
Attys.

Nov. 3, 1925.
W. E. GLASPEY
MECHANISM FOR MAKING GLASS CONTAINERS
Filed Oct. 22, 1923   4 Sheets-Sheet 2
1,560,158
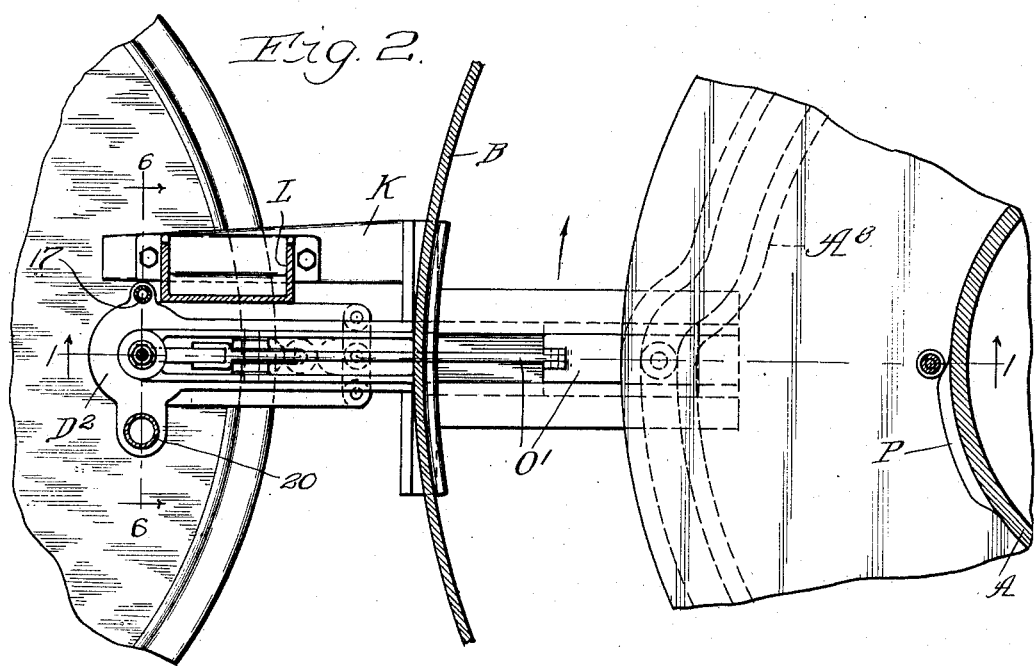
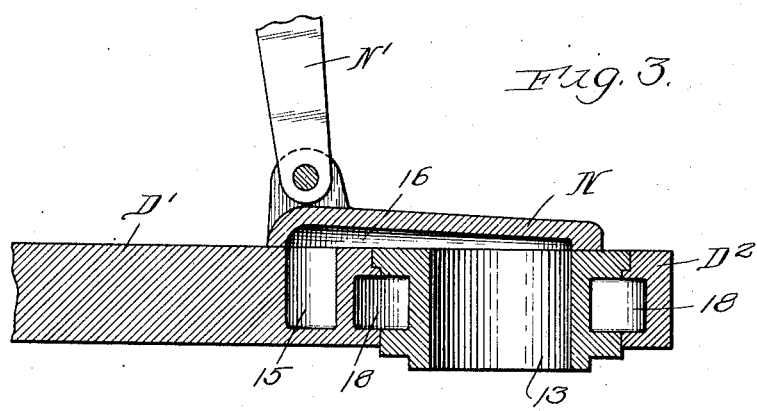
Inventor:
Warren E. Glaspey,

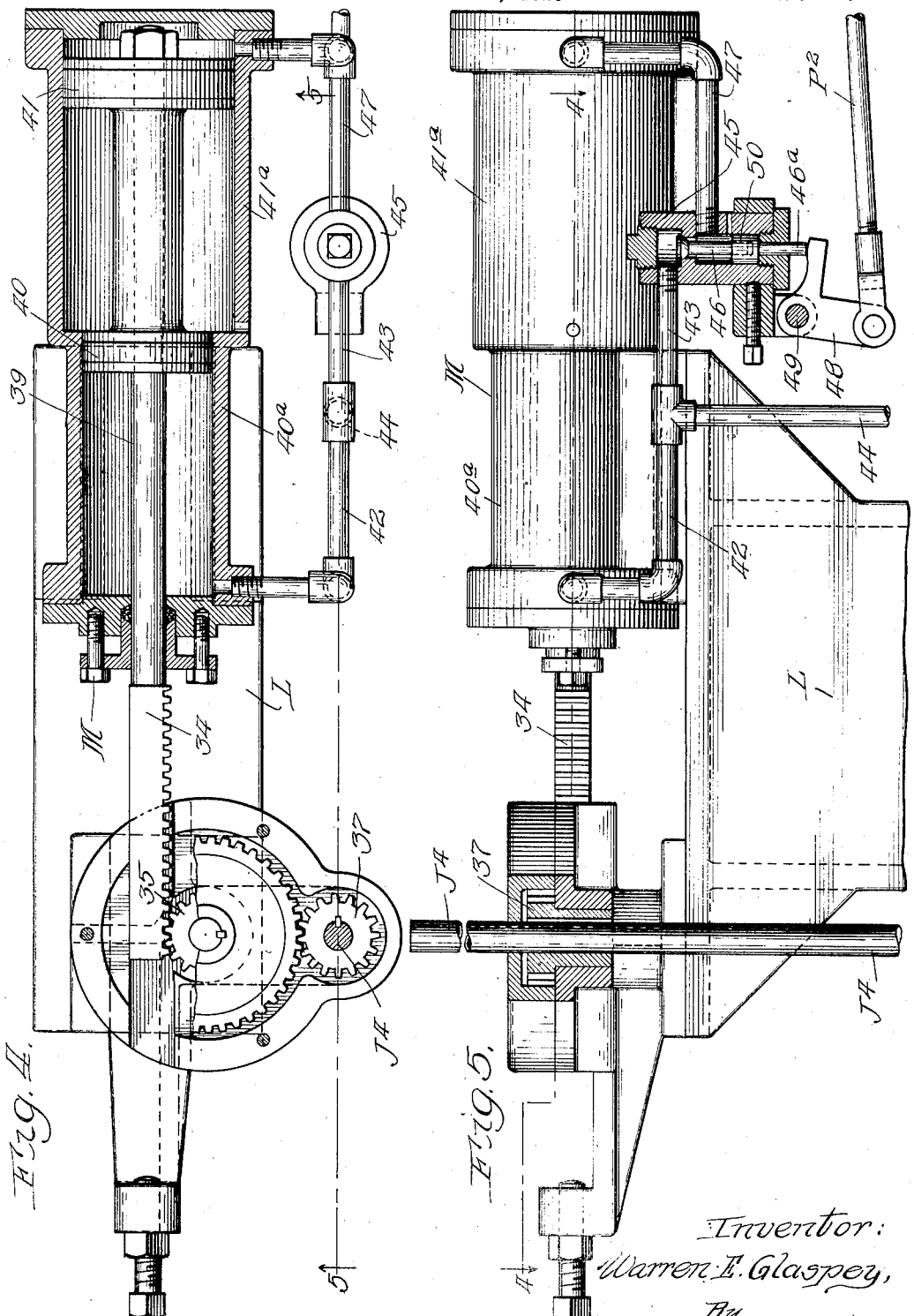

Nov. 3, 1925. 1,560,158
W. E. GLASPEY
MECHANISM FOR MAKING GLASS CONTAINERS
Filed Oct. 22, 1923 4 Sheets-Sheet 4
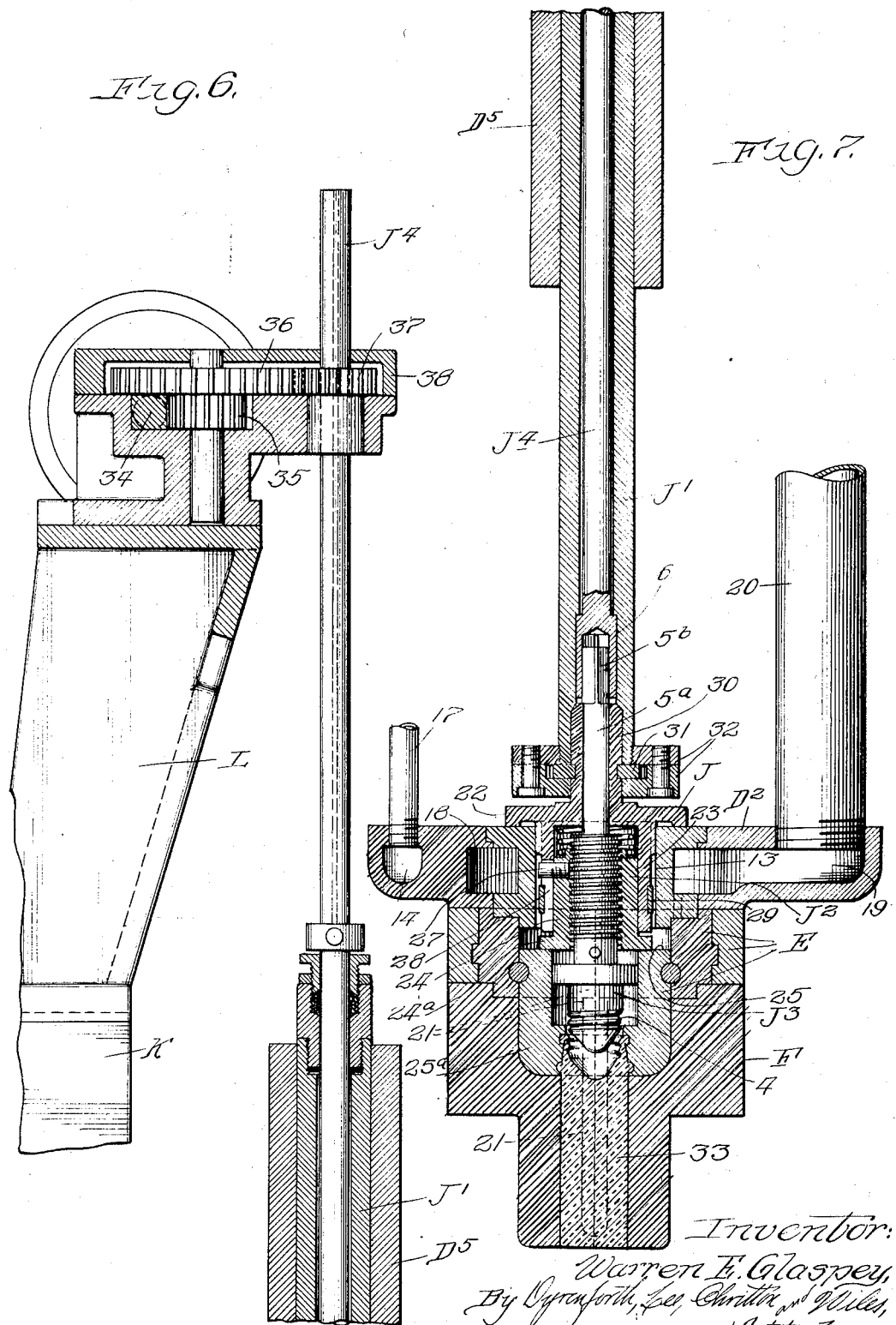

Patented Nov. 3, 1925.

1,560,158

UNITED STATES PATENT OFFICE.

WARREN E. GLASPEY, OF BRIDGETON, NEW JERSEY, ASSIGNOR TO SPRING STOPPER COMPANY, OF NEW YORK, N. Y., A CORPORATION OF DELAWARE.

MECHANISM FOR MAKING GLASS CONTAINERS.

Application filed October 22, 1923. Serial No. 670,642.

*To all whom it may concern:*

Be it known that I, WARREN E. GLASPEY, a citizen of the United States, residing at Bridgeton, in the county of Cumberland and State of New Jersey, have invented a new and useful Improvement in Mechanism for Making Glass Containers, of which the following is a specification.

This invention relates particularly to machines provided with parison molds adapted to form blanks, and provided with blow molds for blowing the blank to the shape of the finished article.

The primary object of the present invention is to provide a machine of this general character with mechanism for forming an internal thread in the mouth of the container.

A machine of the general type referred to is disclosed in La France Patent 1,185,687, granted June 6, 1916. Another example of this type of machine is set forth in Bock Patent No. 870,664, granted November 12, 1907.

A machine of the type referred to is provided with a series of neck molds; and there is associated with each neck mold a parison mold and blow mold. The molds are mounted on a rotatable carrier, which carries the associated molds, in turn, to a position over the glass tank; and there, while the neck mold and the parison mold are in closed condition and in cooperative relation, they are lowered so that the lower end of the parison mold will dip into or contact with the molten glass. Suction is then applied, and the charge of glass is thus introduced into the parison mold and neck mold. At such time, in accordance with the present invention, a thread-equipped mandrel extends into the neck mold and is provided with a tip which acts as a core to form an initial recess in the upper end of the blank mold, while the thread on the mandrel operates to mold threads in the mouth of the blank. The neck mold and parison mold are then raised, the parison mold is opened, and the blow mold is closed on the blank, after which the blowing operation takes place.

The accompanying drawings illustrate the present invention in its preferred embodiment, showing only such portions of a machine of the general type referred to as are necessary to enable the invention to be readily understood.

A machine of the type referred to is known on the market as the Owens machine. As is well known in the art, such a machine employs a central pillar equipped with suitable cams, and a frame adapted to revolve about said pillar, this frame carrying a series of like mechanisms—any desired number. In the present case, it will suffice to illustrate one set of mechanisms.

In the accompanying drawings—

Fig. 1 represents a broken vertical sectional view of a machine embodying the invention; Fig. 2, a broken plan section taken as indicated at line 2 of Fig. 1; Fig. 3, an enlarged detailed sectional view taken as indicated at line 3 of Fig. 2; Fig. 4, a plan section taken as indicated at line 4—4 of Fig. 5, showing details of the mandrel-rotating mechanism; Fig. 5, a broken vertical sectional view taken as indicated at line 5 of Fig. 4; Fig. 6, a broken sectional view taken as indicated at line 6—6 of Fig. 1, showing the upper portion of the mandrel-mechanism; and Fig. 7, a continuation of the same section showing the lower portion of the mandrel-mechanism and the association of the mandrel with the neck mold and parison mold.

In the illustration given, A represents the central stationary pillar having a base-disc A' mounted on a base-frame $A^2$, the pillar A being equipped with a series of annular cams $A^4$, $A^5$, $A^6$, $A^7$ and $A^8$; B, a rotatable frame having a base-portion B' supported on the base-disc A' and adapted to revolve thereon; C, driving mechanism mounted on the stationary member $A^2$ and equipped with a pinion C', which drives the frame B through the medium of a large gear or circular rack $B^2$; D, a vertically movable dipping frame (only one of a series being shown), which is mounted in a way or guide $B^3$ with which the rotary frame, or mold carrier, B, is equipped, the dipping frame D having a radial extension or bracket arm D', which has formed integrally with its outer extremity the dipping head $D^2$; $D^3$, mechanism of well known construction serving to raise and lower the dipping head, the mechanism $D^3$ being actuated by the cam $A^7$; $D^4$, a vertical plate forming a part of the frame D and carrying a slotted tubular bearing D⁵; E, a sectional neck mold supported on a pivot 1 carried by the arm D' and adapted to be opened and closed by mechanism E', which, in turn, is actuated by the cam A⁶; F, a sectional parison mold mounted on the pivot 1 and adapted to be opened and closed by mechanism F', which, in turn, is operated by the cam A⁵; G, a sectional blow mold mounted on a pivot 2, with which the carrier B is equipped, and adapted to be opened and closed by mechanism G', which, in turn, is operated by the cam A⁴; H, an annular stationary cam carried by the base-member A' and serving to raise and lower the blow molds; I, a portion of the glass tank (usually a revolving tank which forms a part of the furnace), this tank containing a pool of molten glass from which a supply is sucked into each parison mold, in turn; J, a mandrel-head which constitutes a combined cap-piece and mandrel-bearing, said head being carried by a tubular shank J' which works in the guide D⁴ and which is equipped with teeth 3, forming a rack through the medium of which the member J may be raised and lowered; J², a nut mounted in the head J; J³, a mandrel having a thread-equipped tip 4, and having a threaded shank 5 which engages the nut J², the shank 5 having extending upwardly therefrom a smooth stem 5ᵃ with a squared or angular extremity 5ᵇ; J⁴, a rotatable vertical shaft journaled in the sleeve-like rack J' and equipped at its lower end with an angular socket 6 which engages the angular portion 5ᵇ of the mandrel-shank; K, a bracket-arm projecting radially from the carrier B; L, a standard supported on the bracket-arm K; M, mechanism for rotating the shaft J⁴ in either direction; N (Figs. 1 and 3) a sliding cap or valve, which serves to connect the ports in the dipping head D² when air is to be admitted to the blow mold (after the head J has been elevated); N', a lever mounted on a pivot 7; O, a rock member mounted on pivot 8 and equipped with a segmental cam slot 9 which engages a cam stud 9ᵃ with which the lever N' is equipped at its upper end, the member O being further equipped with a segmental rack or gear section 10, which engages the rack 3; O', mechanism for actuating the rock member O, the mechanism O' being operated, in turn, by the cam A³; and P, a cam on the stationary pillar A, which serves to actuate a lever P' supported on a pivot 11 carried by the top member 12 of the rotary carrier B, the lever P' operating, through the medium of a connecting rod P² to control the pneumatic device which constitutes a portion of the mandrel-rotating mechanism M.

The dipping head D² is raised and lowered in a manner understood in the art. It will be understood that there are a series of such dipping heads; that there is a set of molds associated with each dipping head; and that there is a mandrel and mandrel-actuating mechanism associated with each dipping head.

Also, the neck molds E, the gathering molds, or parison molds F, and the blow molds G are operated in the usual manner.

The dipping head D² is provided with a vertical bore 13 (Figs. 3 and 7); and it is further provided with communicating passages 14 and 15, the latter opening at the upper surface of the dipping head and adapted to be placed in communication with the bore 13 by means of a passage 16 with which the cap N is provided, assuming the cap J to be lifted out of the way and the cap N moved into the operative position. With the passage 14 communicates an air pressure pipe 17 through which air passes at the proper time to perform the blowing operation.

The dipping head D² is provided also with an annular passage 18 which communicates with a port 19 having connected therewith an exhaust pipe 20. Suction exerted through the cored passage 18 is communicated through vertical passages 21 to the bores of the neck mold and parison mold in the usual manner. Thus, when the pipe 20 is exhausted at the proper period, glass will be drawn from the glass tank I into the gathering mold to form the parison.

The combined cap-piece and mandrel-bearing J is provided with a disk-like cap-portion 22, which is adapted to bear upon the upper surface of the dipping head D², and is also provided with a tubular portion 23 which is adapted to fit into the bore 13 of the dipping head. Mounted in the bore of the tubular member 23 is a nut 24 which is capable of slight vertical movement. The nut 24 has its lower end equipped with a flange 24ᵃ, which is adapted to bear on a horizontal shoulder 25 afforded by one of the parts 25ᵃ of the neck mold E. The nut is adapted to be pressed firmly against the shoulder 25 by a spring 26 which is confined in the bore of the tubular member 23 between the upper end of the nut and the upper end of said bore. The nut is equipped with a laterally projecting stud 27 which is capable of limited movement in a vertical slot 28 with which the tubular member 23 is provided. A split ring 29 embraces the tubular member 23 and engages a circumferential slot therein, thus closing the slot 28 sufficiently to prevent the nut from dropping out of its bearing. The nut is confined against rotative movement by the stud 27 engaging the slot 28.

The head J, which may also be referred to as a mandrel-head, is connected with the tubular rack J' by any suitable means. In the illustration given, the head J is shown provided with a tubular shank 30 having a a circumferential recess engaged by ring sections 31 confined between clamping members 32, one of which has pivoted connection with the lower end of the sleeve J', and the other of which has a flange which engages the lower surfaces of the members 31.

Referring to Fig. 7, the lower end of the gathering mold, or parison mold, F, is open to admit glass to the mold. The figure shows the parison 33 formed in the mold, the mandrel J³ having been turned counter-clockwise to disengage the thread with which the mandrel-tip is provided from the thread formed in the mouth of the parison. This unscrewing of the mandrel from the glass takes place preparatory to the lifting of the combined cap-piece and mandrel-bearing J away from the dipping head to permit the valve or cap N, which functions during the blowing operation, to be moved to the operative position as shown in Fig. 3.

Assuming the cap J to be in the position shown in Fig. 7, when the shaft J⁴ is rotated clockwise, it turns the mandrel, the angular shank portion 5ᵇ slipping in the angular socket 6. Assuming the shaft J⁴ to be rotated counter-clockwise, the mandrel is withdrawn from the mouth of the parison preparatory to lifting the head J.

As has been indicated, the head J is lifted through the operation of the gear segment 10 on the rack 3; and in the final movement of the member O, the cam slot 9 operates the lever N' and shifts the valve N to the operative position. During the lifting of the rack J', the shaft J⁴ slips through its operating pinion.

The mechanism M, which serves to operate the shaft J⁴ reversibly, comprises a reciprocating rack 34 which engages a pinion 35 which is fixed to turn with a gear 36 which meshes with a pinion 37 which is splined on the shaft J⁴, so that the shaft can slip through the pinion. The gear and the pinions mentioned are contained in a gear case 38, mounted on the standard L.

The rack 34 forms an extension of a piston rod 39 which is equipped with a small piston 40 and a large piston 41, working respectively in cylinders 40ᵃ and 41ᵃ. The pistons are differential pistons contained in different sized cylinders. Air is admitted to the cylinders, alternately, through pipes 42 and 43 which are connected with a common service pipe 44. The pipe 42 connects directly with one end of the smaller cylinder 40ᵃ. The pipe 43 leads to a valve casing 45 which is fitted with a valve 46 which controls a passage leading to the pipe 47, which connects with one end of the larger cylinder 41ᵃ. The valve 46 is in the nature of a check valve which is adapted to be lifted to place the pipe 43 in communication with the pipe 47 through the interior passage of the valve casing, as shown in Fig. 5. The valve 46 has a depending stem 46ᵃ which is adapted to be engaged by the free end of a bell-crank lever 48 which is supported on a pivot 49. The other arm of the bell-crank 48 is connected with the connecting rod P². When the lower end of the lever P' is moved by the cam P, the connecting rod P² is drawn to the right, as viewed in Fig. 1, and thus the valve 46 is lifted, as is evident from Fig. 5. This results in shifting the rack 34 to the left, as viewed in Fig. 4, thus rotating the pinion 37 clockwise, or in the direction to turn the mandrel J³ downwardly through the nut J², assuming the head J to be in operative relation with respect to the dipping head D². The cam P is timed to effect this action after the head J has been lowered to the operative position. After the roller on the lower end of the lever P' passes the cam P, the valve 46 returns to the closed position, the valve itself being equipped with a small piston 50; and since the piston 40 is always under pressure from air supplied through the pipe 42, the rack 34 is returned to its normal position at the right hand end of its stroke, as viewed in Fig. 4. The cam P permits this return to occur after the glass has had sufficient time to cool in the neck mold so that the threads formed in the mouth of the parison will not be distorted by the operation of unscrewing the mandrel from engagement with the glass threads. This unscrewing action occurs before the mechanism O', O operates to lift the rack J' and thus elevate the head J.

After the withdrawal of the head J and its attendant parts, the valve N is shifted to the operative position. In the mean time, the gathering mold F is opened, and the blow mold G has been substituted for the gathering mold. These actions occur, of course, after the dipping frame D has been raised to elevate the gathering mold and ring mold from the position which they occupy while the glass is being drawn by suction into the molds.

The blowing operation is performed in the usual manner, after which the ring molds are opened, the blown container being now supported by the blow molds alone. The blow molds then move to the discharging position, are lowered, opened, and discharge the finished article in the manner well understood in the art.

The operation may be summarized briefly. Assuming the neck mold and the parison mold to be in cooperative relation and in closed condition and to be in position over the glass tank, the dipping frame D is lowered through the medium of the mechanism D². In the mean time, the head J has been lowered into operative relation with respect to the dipping head D², and the shaft J⁴ has been rotated clockwise by means of the mechanism M, thus turning the mandrel through the nut J² to the lowered position, so that it will extend into the mold cavity of the neck mold. At the proper moment, suction is supplied through pipe 20, thus drawing glass into the gathering or parison mold F. In practice, a suitable shear (not shown) is employed to cut the glass beneath the parison mold. After the gathering operation, the dipping frame is elevated, the mandrel is turned counter-clockwise and withdrawn from the mold cavity; and as the machine continues its rotation, the parison mold is opened, and the blow mold is substituted for the parison mold. In the mean time, the valve N is moved to operative position to enable the blowing operation to be performed.

It may be noted that the tip of the mandrel J³ is provided below the threaded portion 4 with a rounded extremity which serves as a core and forms a depression in the glass below the thread. When the blowing pressure is applied, the air enters this depression and blows the glass to the form of the blow mold.

The invention enables containers with internally threaded mouth portions to be produced in this type of labor saving machine without detriment to the operation of the machine and without decreasing the speed of the machine. As is well known, a machine of this type has a large output, and the present invention enables internally threaded containers to be produced by such a machine in large quantities and at small cost of production.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. In combination with a dipping head, a neck mold associated with said dipping head and a gathering associated with said neck mold, a mandrel-head having a tubular member extending into a bore with which the dipping head is provided, a non-rotatable nut movably mounted in said tubular member, a spring tending to depress said nut, the lower end of said nut having a bearing on a shoulder with which the neck mold is provided, a mandrel having a thread-equipped tip and having a threaded shank working in said nut, means for raising and lowering the mandrel-head, and means for effecting rotation of the mandrel while permitting longitudinal movement of the mandrel.

2. In combination with a dipping head, a neck mold associated with said dipping head and a gathering mold associated with said neck mold, a mandrel-head adapted to be brought into cooperative relation with said dipping head, a nut carried by said mandrel-head, a mandrel having a thread-equipped tip and having a threaded shank working in said nut, a tubular rack carrying said mandrel-head, a shaft extending through said tubular rack and serving to turn the mandrel, and mechanism for rotating said shaft in either direction.

3. In combination with a dipping head, a neck mold associated with said dipping head and a gathering mold associated with said neck mold, a mandrel-head adapted to be brought into cooperative relation with said dipping head, a nut carried by said mandrel-head, a mandrel having a thread-equipped tip and having a threaded shank working in said nut, a tubular rack carrying said mandrel-head, a shaft extending through said tubular rack and serving to turn the mandrel, and mechanism for rotating said shaft in either direction, the connections between said shaft and its rotating mechanism permitting longitudinal movement of said shaft.

4. In combination with a dipping head, an associated neck mold, and an associated gathering mold, a mandrel-head equipped with a nut, a mandrel having a threaded shank working in said nut, a tubular rack carrying said mandrel-head, a shaft extending through said rack and having slip connection with the mandrel-shank adapted to effect rotation of the mandrel, a gear segment engaging said rack, mechanism for actuating said gear segment to raise and lower the rack, and reversing gear mechanism adapted to rotate said shaft in either direction, said gear mechanism being provided with a pinion having splined connection with said shaft, permitting movement of the shaft through said pinion.

5. In combination with a dipping head, a neck mold and a gathering mold, a mandrel-head, means for moving said mandrel-head into and out of operative relation with respect to said dipping head, a nut carried by said mandrel-head, a mandrel having a threaded shank working in said nut, means for rotating said mandrel in either direction, a valve adapted to be moved to operative relation with respect to said dipping head after withdrawal of said mandrel-head, and means for moving said valve to the operative position and withdrawing it from the operative position.

6. In combination, a stationary pedestal equipped with a cam, a rotary frame, a dipping frame mounted on said rotary frame, means for raising and lowering said dipping frame, a dipping head carried by said dipping frame, a neck mold associated with said dipping head, a gathering mold associated with said neck mold, said mold being raised and lowered by said frame, a mandrel-head adapted to be brought into cooperative relation with respect to said dipping head, means for moving said mandrel-head to the operative position and withdrawing it therefrom, a nut carried by said mandrel-head, a mandrel having a threaded shank working in said nut, and mandrel rotating means comprising gear mechanism, a rack serving to reversibly operate said gear mechanism, and a pneumatic device serving to operate said rack, said pneumatic device being controlled by said cam.

7. In combination, a non-rotating pedestal, a rotating carrier mounted thereon, a dipping frame mounted on said carrier and equipped with a dipping head, a suction gathering mold associated with said dipping head, a mandrel-head equipped with a shank, mechanism for raising and lowering said mandrel-head through the medium of said shank, said mechanism being controlled by a cam carried by said stationary pedestal, a nut carried by said mandrel-head, a mandrel having a threaded shank working in said nut, a shaft adapted to actuate said mandrel, mechanism adapted to rotate said shaft in either direction, and a cam carried by said pedestal and controlling the operation of said last mentioned mechanism.

8. In combination, a non-rotating pedestal, a rotating carrier mounted thereon, a dipping-frame mounted on said carrier and equipped with a dipping-head provided with a bore, a neck-mold and a gathering-mold mounted on said dipping-frame and associated with said dipping-head, a mandrel-head adapted to extend into said bore, said mandrel-head being provided internally with a nut and being equipped with a shank, mechanism for raising and lowering said mandrel-head through the medium of said shank, a cam carried by said stationary pedestal serving to actuate said mechanism, a mandrel having a threaded shank working in said nut and having a thread-equipped tip, a shaft extending through said mandrel-head shank and adapted to actuate the mandrel, mechanism mounted on said rotating carrier above the shank of said mandrel-head and adapted to rotate said shaft in either direction, and a cam carried by said pedestal and controlling the operation of said last-mentioned mechanism.

9. In combination with a dipping-frame provided with a dipping-head, means for raising and lowering said dipping-frame, a neck-mold and a gathering-mold mounted on said dipping-frame, a mandrel-head having a tubular member extending into a bore with which the dipping-head is provided, a nut mounted in said mandrel-head, said mandrel-head being adapted to serve as a cap for said bore, a mandrel having a thread-equipped tip and having a threaded shank working in said nut, means for raising and lowering the mandrel-head, a valve adapted to serve as a cap for said bore when the mandrel-head is withdrawn, means for actuating said valve, and mechanism for reversibly rotating the mandrel while permitting longitudinal movement of the mandrel.

WARREN E. GLASPEY.